United States Patent Office 3,469,967
Patented Sept. 30, 1969

1

3,469,967
PROCESS FOR THE PRODUCTION OF NICKEL REFRACTORY OXIDE POWDERS AND PRODUCT THEREOF
Basil Meddings and Bauke Weizenbach, Fort Saskatchewan, Alberta, David John Ivor Evans, North Edmonton, Alberta, and Vladimir Nicolaus Mackiw, Fort Saskatchewan, Alberta, Canada, assignors to Sherritt Gordon Mines Limited, Ontario, Canada, a company of Canada
Filed Feb. 10, 1966, Ser. No. 543,495
Claims priority, application Canada, Feb. 12, 1965, 923,160
Int. Cl. C22b 23/00
U.S. Cl. 75—.5                                                17 Claims

ABSTRACT OF THE DISCLOSURE

A process for preparing nickel powder particles having submicron sized refractory oxide particles fixed in the surfaces thereof which involves the impregnation of finely divided basic nickel carbonate particles with discrete submicron sized refractory oxide particles following by the direct reduction of the refractory oxide impregnated basic nickel carbonate particles to elemental nickel powder by reacting a liquid suspension of the impregnated elemental particles with hydrogen at elevated temperature and pressure.

---

Figure 1:
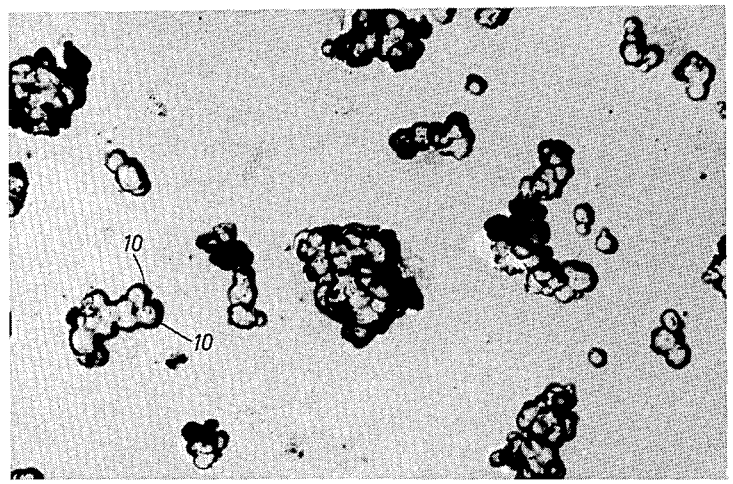
Figure 2:
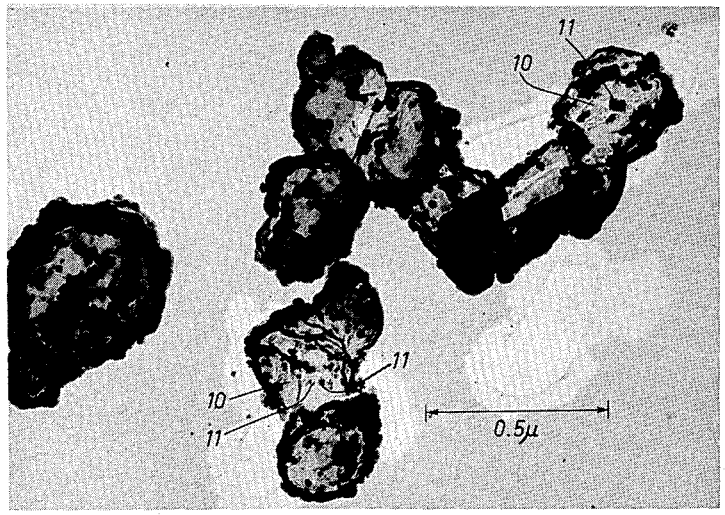

This invention relates to a process for producing nickel-refractory oxide compositions in powder form and to the product of said process. More particularly, it is concerned with the production of such compositions in a form which is ideally suited for the fabrication of dispersion strengthened nickel and nickel base alloy products by powder metallurgical techniques.

In recent years, considerable effort has been devoted to the development of materials capable of withstanding stress at high temperatures for extended periods of time. There is an ever-increasing demand for such materials for fabrication of components such as nozzle ring assemblies, flame holders and turbine blades and buckets for jet engines, gas turbines and the like.

It is known that the high temperature strength properties of some metals and alloys may be considerably improved by the presence in the metal matrix of uniformly dispersed, ultra-fine particles which are stable and substantially insoluble in the matrix metal at the working temperature of the metal or alloy. Among the more promising of these dispersion strengthened metals and alloys are nickel and nickel base alloy compositions containing sub-micron sized refractory oxides, such as thoria, uniformly dispersed throughout the metal matrix. These materials are generally produced by powder metallurgical techniques involving application of compacting, sintering and hot and cold mechanical working operations to powder compositions containing the desired constituents. Most commonly, such powder metallurgy compositions consist of an intimate physical mixture of fine metal powders and refractory oxide particles. Compositions are also known in which the oxide component is incorporated in the matrix metal of one or more of the metal powders. These latter compositions are generally preferred to mere physical mixtures of refractory oxide particles and fine metal powders since the problem of segregation of the oxide particles is overcome and, at the same time, it is generally possible to obtain a more uniform distribution of the oxide particles in the matrix metal of the final product.

Methods are known by means of which finely divided refractory oxide particles can be coated with or incorporated in a matrix metal, such as nickel, which is itself in powder form. One such method is described in Canadian

2

Patent No. 562,160 and comprises, broadly, the steps of dispersing solid insoluble particles in an ammoniated solution which contains, in solution, a compound of a metal selected from the group consisting of Os, Rh, Ru, Ir, Au, Pt, Pd, Ag, Cu, As, Sb, Ni, Cd and Co. The solution is reacted with a reducing gas at a temperature above about 100° F. and under a positive partial pressure of reducing gas to reduce the dissolved metal to elemental metal from and precipitate it from the solution. Metal precipitated from the solution during the reducing reaction deposits on and forms a film or coating on the solid particles dispersed and held, by active agitation, in suspension in the solution. The reduced metal forms a film or coating of substantially uniform, predetermined thickness on the individual particles or clusters of particles dispersed in the reaction solution.

Another process, disclosed in Canadian Patent No. 678,298, involves the precipitation of an oxidized compound of a metal selected from the group consisting of Fe, Co and Ni from an aqueous solution as a coating on sub-micron sized refractory particles dispersed in the solution. The oxidized compound-coated refractory particles are separated from the solution and dry-reduced with hydrogen at elevated temperatures below the sintering temperature of the metal to convert the oxidized compound to elemental metal. The reduced product from this step is then further sintered to produce a metal powder product consisting of particles of nickel, cobalt, iron or alloys of these metals containing uniformly dispersed refractory oxide particles, each oxide particle being substantially completely surrounded with matrix metal.

Neither of the foregoing methods provides an entirely satisfactory method for producing nickel-refractory oxide powders suitable for powder metallurgical fabrication of dispersion strengthened nickel and nickel base alloy products.

The first mentioned process in which the nickel is precipitated from solution as a coating on the refractory particles is satisfactory from an operational point of view in that composite particles can be produced efficiently and economically with a wide variety of core materials. However, the products produced by this process are not entirely satisfactory for the production of wrought dispersion strengthened products in that the refractory particles are not generally uniformly dispersed through the matrix metal of the nickel particles but, rather, occur as discrete particles or agglomerations of particles substantially uniformly coated with a layer of metal. It is found that very extensive working is required in order to effect completely uniform dispersion of the refractory oxide phase in the metal matrix and even with extended working, the refractory oxide agglomerates are not always broken down and dispersed in the matrix metal.

The second process referred to above is capable of producing a nickel-dispersoid powder product which is generally suitable for fabricating dispersion strengthened nickel and nickel base alloy products, but the process itself has serious economic and operating disadvantages. The process operates with very dilute solutions with the result that large volumes of solution must be prepared, handled, filtered, etc. The oxidized compound precipitation step and the reduction and sintering steps are somewhat complex and difficult to carry out from an operational point of view. The overall process is very time consuming and requires relatively expensive reagents including large quantities of pure, dry hydrogen. The result is that the final product is very costly and its use must be restricted to applications where material costs are not an important consideration.

A principal object of the present invention is to provide an efficient and economic process for the production of nickel-refractory oxide compositions suitable for powder metallurgical fabrication of dispersion strengthened nickel and nickel base alloy products. A further object of this invention is the provision of a process for the production of ultra-fine nickel particles having discrete, sub-micron sized refractory oxide particles in integral association therewith. Another object of this invention is to provide an easily controlled hydrometallurgical process for the rapid and economic production of composite nickel-refractory oxide particles which are ideally adapted for use in fabrication of dispersion strengthened nickel and nickel base alloys by powder metallurgy techniques. A further object of this invention is to provide a novel nickel-refractory powder consisting essentially of fine, non-pyrophoric nickel particles of a size below about 2 microns having discrete, sub-micron sized refractory metal oxide particles integrally associated therewith.

These and other objects of this invention are accomplished by means of a relatively simple process which employs readily available and inexpensive reagents and by which nickel-refractory oxide particles of uniform quality are rapidly and efficiently produced. Briefly, the process of the invention involves the impregnation of finely divided basic nickel carbonate particles with a controlled quantity of discrete, sub-micron-sized refractory oxide particles followed by the direct reduction of the impregnated basic nickel carbonate particles to elemental nickel by reacting a liquid suspension of the impregnated particles with hydrogen at elevated temperature and pressure. The term "basic nickel carbonate" as used herein means not only technically pure basic nickel carbonate comprised of 50% nickel hydroxide and 50% nickel carbonate but includes complexes containing nickel hydroxide nickel carbonate in any other proportions.

According to a preferred embodiment of the invention, basic nickel carbonate having physical properties which render it particularly suitable for the purposes of this invention is prepared by boiling an aqueous nickel ammine carbonate solution to drive off ammonia and carbon dioxide and precipitate a very finely divided basic nickel carbonate comprised of about 65% nickel hydroxide and about 35% nickel carbonate. This basic nickel carbonate is impregnated with discrete refractory oxide particles by injecting sub-micron sized oxides into the suspension of the basic nickel carbonate in aqueous media derived from the boiling operation. The refractory oxide particles are rapidly adsorbed by the basic nickel carbonate particles. The suspension is actively agitated to improve the distribution of refractory oxide particles throughout the system and is then reacted with hydrogen to effect reduction of the oxide impregnated basic nickel carbonate to elemental nickel.

The nickel-refractory oxide powder product of this invention is comprised of non-pyrophoric particles about 0.2–0.5 microns in size which have an irregular shape in which the three mutually perpendicular lengths are approximately equal. The 0.2–0.5 micron particles may occur singly or as agglomerates up to 5 microns in size. The surfaces of the nickel particles are covered with refractory oxide particles, the density of distribution of which varies from single particles to loose clusters of particles. On the macroscopic scale, the powder has an apparent density of about 0.3–1.0 gms./cc., a surface area of about 1–2 m.$^2$gm. and a Fisher number of less than 1.3.

In carrying out the process of this invention, finely divided basic nickel carbonate is suspended in a liquid medium in which it is substantially insoluble. Normally the suspension medium will be water. However, the process is operable with other liquid suspending media such as alcohols, alkanols, ketones, esters and the like. Any liquid which will not react with the basic nickel carbonate or hydrogen and which will withstand the other operating conditions may be used in the present process. However, aqueous media will be the most commonly employed suspension medium and the invention will be described in detail with respect to its use only.

The basic nickel carbonate which is to be suspended in aqueous media may be produced by any conventional or unconventional means. However, nickel-refractory oxide (sometimes referred to generally herein as "nickel-dispersoid" powders) most suitable for fabrication of dispersion strengthened products are produced when exceedingly fine basic nickel carbonate is used. We have found that by removing ammonia and carbon dioxide from a nickel ammine carbonate solution by boiling, a very fine, low density basic nickel carbonate of particularly suitable characteristics can be obtained. Further, this powder can be readily impregnated with discrete refractory oxide particles without separation from the solution from which it is precipitated. This procedure has important practical implications since it eliminates the necessity of separating the very fine basic nickel carbonate (which is difficult to filter) from the mother liquor.

The conditions under which the boiling step is conducted are important as the length of the boil and the rate and manner of heat input affect the properties of the basic nickel carbonate which is formed. Boiling can be carried out by indirect heating or by flashing a solution from a high temperature. However, it is generally preferred to effect boiling at atmospheric pressure by direct injection of live steam into the nickel ammine carbonate solution. This effects very rapid distillation of ammonia and carbon dioxide.

For aqueous suspending media, solution conductivity provides a convenient criterion for determining the end point of the boiling step. Generally, the boiling is continued until the conductivity of the slurry falls below about 500 micromhos per centimetre. In most cases, where steam injection is used, total boiling time will be about 40–120 minutes.

The source of the nickel ammine carbonate solution used in the boiling step is not important. This can be produced, for example, by leaching elemental nickel with an ammonium carbonate solution or by dissolving nickel oxide or nickel carbonate in an ammoniacal ammonium carbonate solution.

A preferred procedure is to leach high purity nickel powder in an ammoniacal ammonium carbonate solution containing about 100–120 g.p.l. free $NH_3$ and about 80–90 g.p.l. of $CO_2$ to yield a leach solution containing up to about 100 grams per litre nickel. This solution can be diluted with water to about 70 to 80 grams per litre nickel prior to the boiling step.

The type and quantity of refractory oxide added to the basic nickel carbonate suspension are matters of selection depending on the type of end product desired. In general, it is known that refractory oxides selected as the dispersoid for dispersion strengthening at high temperatures must have a melting point appreciably higher than that of the matrix metal, must have good thermal stability, must have low solubility in the matrix metal and must be non-reactive with the matrix metal at standard and elevated temperatures. The following refractory oxides are among those most suitable for the purposes of this invention: $Y_2O_3$, $ThO_2$, $MgO$, $ZrO_2$, $SiO_2$, $UO_2$, $La_2O_3$, $BeO$, $Al_2O_3$, $HfO_2$, $CeO_2$, $TiO_2$.

The size of the dispersoid particles is important. The particles should be less than 100 millimicrons in size and preferably in the range of 10 to 30 millimicrons. Also, the particles must be substantially insoluble in the suspending medium. This requirement precludes the use of calcia and baria, for example, where the suspending medium is water.

Many refractory oxides in the desired size range are readily available in the form of colloidal aquasols. Such aquasols of thoria, ceria, zirconia and titania, for example, are well known and commercially available. Thoria is a preferred dispersoid material; the preference being based not only on the superior properties of nickel-thoria end product but on the ready availability of thoria in the preferred size range in the form of colloidal aquasols. The dispersoid can also be provided in the form of finely divided discrete powder particles. Thoria and yttria, for example, are available in this form in sub-micron sizes and have been found suitable for the purposes of the invention.

The amount of dispersoid added depends on the nickel concentration of the slurry and the oxide content desired in the final product. The operability of the process is not effected by the amount of dispersoid added; for example, any amount of refractory oxide from a trace to 50% by volume or more can be readily incorporated in nickel powder by this process. The optimum concentration in any given case will depend on the type of dispersoid employed and the end use contemplated for the nickel-dispersoid powder product. For example, in powders used for the production of wrought nickel-thoria compositions, the optimum thoria content, using 5–30 millimicron thoria particles, has been found to be about 2.0–4.0% thoria by volume. Where the nickel-refractory oxide powder is to be mixed with other metal powders such as chromium, molybdenum or tungsten for example to produce nickel base alloys, the refractory oxide content of the powder may be increased or decreased having regard to the quantity of alloying metals present, to maintain the dispersoid content at the optimum level.

The refractory oxide dispersoid can be added to the basic nickel carbonate suspension in any convenient, non-agglomerated form either before or after charging into the reduction autoclave or before or after heating to reduction temperature. It is generally preferable to add the selected refractory metal oxides in the form of a colloidal aquasol or in the form of a slurry in distilled water. For example, a 10% suspension of thoria and/or yttria in water is satisfactory. A single refractory oxide, such as thoria, for example, can be used or mixtures of two or more different oxides can be added.

Once added, the refractory metal oxide particles are absorbed by the basic nickel carbonate. Agitation of the suspension during the addition and for a few minutes afterwards will improve the distribution of the refractory oxide particles throughout the system. The suspension can then be treated directly in the hydrogen reduction step.

The concentration of basic nickel carbonate in the suspension is not a critical factor insofar as the operability of the process is concerned. However, one of the important advantages of the invention is the economy resulting from the fact that relatively concentrated slurries may be treated. In general, slurries containing basic nickel carbonate equivalent to up to 250 g.p.l. can be handled without serious difficulty. However, a preferred concentration range within which all advantages of the invention are obtained to their fullest extent is that equivalent of a nickel concentration of about 80–120 g.p.l.

In the hydrogen reduction step of the process, the basic nickel carbonate-refractory oxide suspension is treated with hydrogen gas in a closed reaction vessel at elevated temperature under a positive partial pressure of hydrogen for a time sufficient to effect substantially complete reduction of the basic nickel carbonate to elemental nickel.

The reduction can be carried out at temperatures ranging from about 100° F. to 500° F. or higher. A preferred range, however, is between about 200° F. and about 350° F. Lower temperatures result in an unnecessarily slow reaction rate, and at higher temperatures any additional advantage gained in increased reaction rate is offset by the added expense of providing equipment capable of withstanding the more severe conditions.

Hydrogen partial pressure during the reaction is maintained above about 50 pounds per square inch and preferably from about 100 to about 500 pounds per square inch. At a partial pressure of hydrogen below about 50 p.s.i., the reaction proceeds too slowly and the increased rate of reaction obtained at hydrogen partial pressures above 500 p.s.i. usually do not warrant the cost of the high pressure equipment required to conduct the reaction under such conditions.

The reduction reaction is self-nucleating, that is, no seed or nucleation agent is required to initiate it. The reduction proceeds rapidly at temperatures above about 350° F. and hydrogen partial pressures above about 450 p.s.i. and will generally be complete in less than an hour. The reaction speed can be further accelerated by the addition to the suspension of a reduction catalyst.

Such catalysts include anthraquinone, substituted anthraquinone, benzoquinone, naphthaquinone, ortho- and para-polyhydric phenols, tannic acid and morin. The use of such addition agents promotes very rapid reduction even at relatively low reduction temperatures. For example, the presence of up to about 0.5 g.p.l. and, preferably, about 0.02 to 0.3 g.p.l. of anthraquinone in the reduction suspension enables reduction to be completed in less than 15 minutes, and usually about 3–5 minutes at temperatures in the range of 250° F.–275° F. It is generally preferred to operate the process within this lower temperature range since heat requirements are lower, less expensive equipment is required to withstand safely the operating pressures and less time is required for heating and cooling the reduction autoclave for each reduction cycle. Upon completion of the reduction reaction, the slurry is cooled, filtered and the product powder washed and dried.

The product consists of fine nickel powder, of a size up to about 5.0 microns and in most cases less than 2.0 microns, and having sub-micron refractory oxide particles securely attached to the surfaces thereof. The powder is non-pyrophoric in its as-produced state despite its exceedingly fine size and is characterized by being formed of very fine, irregular-shaped particles of nickel, about 0.2 to about 0.5 micron in size. These 0.2–0.5 micron particles occur singly and in clusters up to about 5.0 microns in size. The apparent (bulk) density of the powder is generally about 0.3—about 1.0 gm./cc., the surface area below about 2 m.$^2$/gm. and the Fisher number below about 1.3. Because of the extremely small size of the particles of this invention and their irregular shape, an accurate determination of actual average particle size is difficult to obtain. For this reason Fisher number rather than actual particle size is generally used herein to characterize the powder particle size. "Fisher number" as used herein is the value obtained for average particle size by the Fisher sub-sieve sizer, following the procedure based on ASTM standard 13330–58T and using curves mathematically extrapolated from the curves supplied with the standard Fisher equipment to allow measurement of particles below 1 micron in size. Micrographic examination of the powders of this invention indicate that the Fisher number of the powders obtained from such curves corresponds quite closely to the actual particle size in microns.

The nickel-dispersoid powders of this invention are particularly suited to the fabrication of dispersion strengthened wrought nickel and/or nickel alloy products by powder metallurgical techniques. The powder, used alone or combined with one or more alloying metals such as copper, chromium, molybdenum, tungsten etc., enable the incorporation of a uniform dispersion of ultra-fine refractory oxide particles in a metal matrix without problems of segregation or agglomeration of the dispersoid.

The following examples illustrate the process of the invention, and the utility of the products thereof.

EXAMPLE 1

A nickel ammine carbonate solution was prepared by leaching high purity nickel powder (99.8% Ni+Co) with an ammonium carbonate solution containing 155 g.p.l. $CO_2$ and 165 g.p.l. $NH_3$. The leach was carried out at a temperature of 175° F. using 300 p.s.i. compressed air and was complete in five hours. The leach solution contained 167 g.p.l. nickel. A 60 litre sample of the leach solution was diluted with 40 litres of process water.

The 100 litres of diluted solution was boiled at atmospheric pressure for 110 minutes by injection of 250° F. steam. The conductivity of the suspension was then 210 micromhos/cm.

This suspension was charged into a high pressure agitator equipped autoclave and heated to 275° F. Thoria, in the form of a colloidal aquasol containing 10–30 millimicron thoria particles, was injected into the autoclave in sufficient quantity to provide 3.0 gms. of thoria per 97 grams of nickel present in the suspension. 0.3 g.p.l. of anthraquinone was injected into the suspension and 450 p.s.i. overpressure of hydrogen applied. Reduction commenced immediately and was complete in about 3 minutes (as evidenced by ceasing of hydrogen consumption).

The autoclave was cooled, the powder product recovered and washed and dried.

The product was a very fine, non-pyrophoric nickel powder having the following characteristics.

Composition:
    Ni+Co _____weight percent__ 95.9
    Thoria _____volume percent__ 3.1
    $H_2$ loss _____weight percent__ 0.8
    S _____do____ 0.002
    C _____do____ 0.007
Physical characteristics:
    Apparent density _____gm/cc__ 0.99
    Fisher number _____ 0.53 micrographic and high resolution X-ray diffraction examination showed the powder to consist of discrete, irregular shaped particles of nickel having the bulk of the thoria content attached to or embedded in the surface thereof.

Samples of this powder were formed into wrought strip by powder metallurigical fabricating techniques involving compacting, hot working and repeated cold working and annealing. Samples of the strip were tested for UTS at various temperatures. The results of these tests appear in Table I.

TABLE I

| Test temperature ° F.: | UTS (1,000 p.s.i.) (average of 3 specimens) |
|---|---|
| 1,400 | 33.0 |
| 1,500 | 28.6 |
| 1,600 | 26.1 |
| 1,700 | 21.7 |
| 1,800 | 18.5 |
| 1,900 | 15.3 |
| 2,000 | 13.1 |

Stress-to-rupture tests on this material indicated an average value of 11,300 p.s.i. for a 100 hr. life at 1600° F.

EXAMPLE 2

The basic nickel carbonate suspension of Example 1 was employed and the procedure of Example 1 followed except that the dispersoid was yttria powder consisting of discrete particles in the 20–30 millimicron range. The equivalent of 2.5 gms. of yttria per 100 gms. of nickel was injected into the heated autoclave as a 10% slurry in distilled water.

The reduced product was fabricated by the procedure of Example 1. The strip so-produced exhibited an average UTS at 1600° F. of 22,100 p.s.i.

EXAMPLE 3

The procedure of Example 1 was followed except that 2.5 volume percent ceria, in the form of 10–30 millimicron colloidal aquasol, was added as the dispersoid in place of the thoria. The fabricated powder product exhibited a UTS of 21,300 p.s.i. at 1600° F.

EXAMPLE 4

1000 gms. of commercially available basic nickel carbonate analyzing 45% nickel, 15% $CO_2$, balance water were mixed with 8½ litres of distilled water in an agitator equipped high pressure autoclave. 10 gms. of 5–15 millimicron thoria suspended in 100 cc. of distilled water and 2.7 gms. of anthraquinone were added to the agitated basic nickel carbonate suspension.

The autoclave was sealed and heated to 400° F. The charge was agitated and reacted with 350 p.s.i. of hydrogen. Consumption of hydrogen ceased in 4 minutes. The autoclave was cooled and the product powder discharged and washed and dried.

The powder product analysed (percent by wt.): Ni +Co, 96.3; $H_2$ loss, 1.72; C, 0.28; S, 0.005; and thoria content 2.3 volume percent. Physical characteristics: Apparent density, 0.92 gm./cc.; Fisher number, 0.56; screen analysis, 100%–325 mesh. Ultimate tensile strength of wrought strip produced from this powder by powder metallurgical fabricating techniques was 17,800 p.s.i. at 1600° F.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and appended claims.

What we claim as new and desire to protect by Letters Patent of the United States is:

1. A process for producing nickel powder having discrete refractory oxide particles in integral association therewith which comprises: forming a suspension of finely divided basic nickel carbonate in a liquid medium in which the basic nickel carbonate is substantially insoluble, adding insoluble refractory oxide particles to said suspension; agitating the suspension; reacting the suspension with hydrogen at a temperature above about 100° F. and under a partial pressure of hydrogen of at least about 50 pounds per square inch; continuing said reaction with hydrogen to reduce said basic nickel carbonate to elemental nickel and collecting product powder.

2. A process for producing finely divided nickel powder having discrete refractory oxide particles in integral association therewith which comprises: forming a suspension of finely divided basic nickel carbonate in a liquid medium in which the basic nickel carbonate is substantially insoluble, adding insoluble sub-micron refractory metal oxide particles to said suspension; agitating the suspension; reacting the suspension with hydrogen at a temperature in the range of about 200° F. to about 350° F. and under a partial pressure of hydrogen of at least about 100 to about 500 pounds per square inch; continuing said reaction with hydrogen to reduce said basic nickel carbonate to elemental nickel and collecting product powder.

3. The process according to claim 2 in which said refractory oxide is selected from the group consisting of thoria, yttria, ceria, magnesia, beryllia, zirconia, hafnia, silica, titania, alumina, uranium dioxide and lanthanum trioxide.

4. The process according to claim 2 in which the reduction reaction is carried in the presence of up to about 1 g.p.l. of a catalyst selected from the group consisting of anthraquinone, substituted anthraquinone, benzoquinone, naphthaquinone, ortho- and para-polyhydricphenols, tannic acid and morin.

5. A process for producing finely divided nickel powder having discrete sub-micron sized refractory oxide particles integrally associated therewith which comprises; forming a suspension of finely divided basic nickel carbonate in aqueous media; agitating said suspension and adding thereto water insoluble refractory oxide particles of a size below about 50 millimicrons, said refractory oxide having a melting point above the melting point of nickel and being thermally stable and substantially insoluble in nickel at elevated temperatures below the melting point of nickel; reacting said suspension with hydrogen in a closed reaction vessel at a temperature in the range of about 200° to about 450° F. under a partial pressure of hydrogen in the range of about 100 p.s.i. to about 500 p.s.i.; continuing said reaction with hydrogen to reduce said basic nickel carbonate to elemental nickel and separating and collecting product powder.

6. The process according to claim 5 in which the hydrogen reducing reaction is carried out at a temperature in the range of about 250° F. to about 350° F. in the presence of from about 0.02 to about 0.35 g.p.l. of anthraquinone.

7. The process according to claim 5 in which the refractory metal oxide consists of thoria particles of a size in the range of about 5 to about 30 millimicrons provided in amount equivalent to about 2 to about 4% by weight of nickel present in the suspension.

8. The process according to claim 7 in which the thoria is provided in the suspension in the form of a colloidal aquasol.

9. The process according to claim 6 in which the basic nickel carbonate-water suspension is formed by boiling a nickel ammine carbonate solution to drive off ammonia and carbon dioxide and precipitate basic nickel carbonate.

10. A process for producing finely divided nickel-refractory oxide compositions suitable for use in powder metallurgical fabrication of dispersion strengthened nickel and nickel base alloy products which comprises the steps of: preparing nickel ammine carbonate solution containing up to about 100 grams per litre of nickel; boiling said solution to remove ammonia and carbon dioxide from said solution and to precipitate basic nickel carbonate therefrom whereby a suspension of basic nickel carbonate in aqueous media is obtained; injecting into said suspension refractory oxide particles of a size below about 50 millimicrons in amount equivalent to up to 50% by weight of nickel present in said suspension, said oxide particles being formed of at least one oxide selected from the group consisting of thoria, ceria, yttria, silica, alumina, zirconia, hafnia, beryllia, titania, uranium dioxide, lanthanum trioxide and magnesia; agitating the so-formed basic nickel carbonate-refractory oxide suspension and reacting same in a closed reaction vessel with hydrogen at a temperature between about 250° F. and about 450° F. under a partial pressure of hydrogen between about 100 p.s.i. and about 500 p.s.i.; continuing said reaction to effect substantially complete reduction of basic nickel carbonate to elemental nickel and collecting product powder.

11. The process according to claim 10 in which the nickel ammine carbonate solution is boiled by injection of steam thereinto and such boiling is continued until the conductivity of the solution is reduced to below about 500 micromhos per centimeter.

12. The process according to claim 10 in which between about 0.02 and about 0.3 gram per litre of anthraquinone is provided in the basic nickel carbonate-refractory oxide suspension prior to treatment with hydrogen.

13. The process according to claim 10 in which the refractory oxide is thoria of a size within the range of 10–30 millimicrons and is provided in amount equivalent to about 2.0 to about 4.0% by weight of nickel present in the suspension.

14. The process according to claim 10 in which the ammoniacal ammonium nickel carbonate solution is prepared by leaching nickel powder in an aqueous ammoniacal ammonium carbonate solution.

15. A nickel-refractory oxide powder composition suitable for fabrication of dispersion strengthened nickel and nickel base alloy products which consists essentially of irregular-shaped particles of nickel, about 0.2 to about 0.5 micron in size, said particles occurring singly and in clusters up to 5.0 microns in size and said particles having firmly attached to their surfaces discrete refractory oxide particles of a size below about 50 millimicrons, said composition being non-pyrophoric in the as-produced state.

16. The composition of claim 15 wherein the refractory oxide is at least one member of the group consisting of thoria, yttria, ceria, alumina, zirconia, silica, beryllia, hafnia, titania, uranium dioxide, lanthanum trioxide and magnesia and is present in amount equivalent to about 2.0 to about 4.0 volume percent of the nickel.

17. The composition of claim 16 in which the refractory oxide is thoria particles of a size in the range of about 10 to about 30 millimicrons.

References Cited

UNITED STATES PATENTS 2,805,149   9/1957   Schaufelberger _____ 75—0.5
3,156,556  11/1964   Meddings _____ 75—119

FOREIGN PATENTS 562,160   8/1958   Canada.

L. DEWAYNE RUTLEDGE, Primary Examiner
W. W. STALLARD, Assistant Examiner

U.S. Cl. X.R.

75—119